Nov. 6, 1956
R. F. ESTOPPEY
2,769,959
DYNAMOMETER INSTRUMENT
Filed Feb. 24, 1953
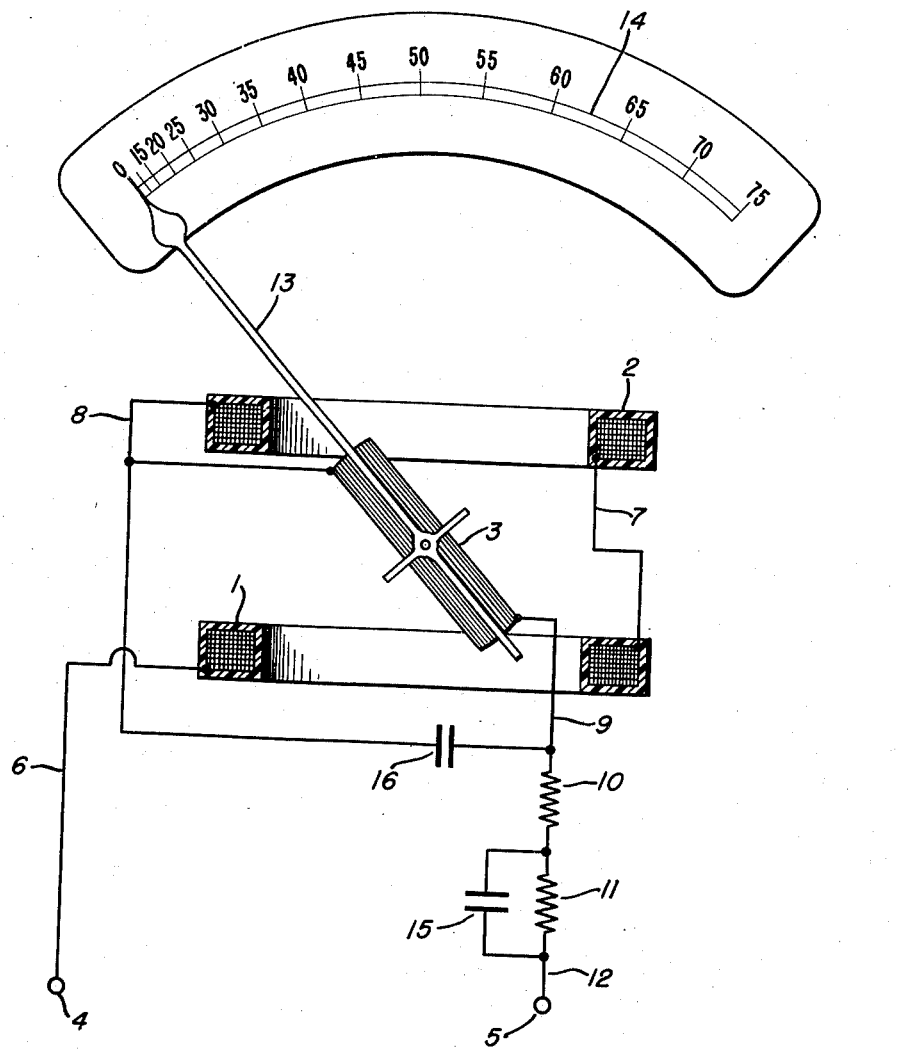
ROYDEN F. ESTOPPEY
INVENTOR.
BY
Gaylor, Cifelli & Quick
ATTORNEYS

United States Patent Office 2,769,959
Patented Nov. 6, 1956

2,769,959

DYNAMOMETER INSTRUMENT

Royden F. Estoppey, Berkeley Heights, N. J., assignor to Weston Electrical Instrument Corporation, Newark, N. J., a corporation of New Jersey Application February 24, 1953, Serial No. 338,465

1 Claim. (Cl. 324—144)

This invention relates to alternating current instruments and more particularly to current responsive devices of the dynamometer type.

Dynamometer instruments are well known in the art for measuring current, voltage and power of an electrical circuit. Such instruments are fundamentally current responsive devices and can be made to respond to applied voltage by inserting a suitable series resistance. However, such instruments include inherent inductance so that the impedance increases with the frequency of the applied current thereby effecting the indicating accuracy of the instrument.

With specific reference to an electrodynamometer voltmeter having a pointer deflectable over a calibrated scale for the direct reading of alternating current potentials, such instrument generally is calibrated on direct current. When used for the measurement of alternating current potentials the instrument will read low due to the inductance of the field and movable coils, such inductance causing the impedance of the circuit to increase above the direct current value. This error can be kept quite small either by limiting the maximum frequency to a predetermined value or by shunting all or a portion of the series resistance by a suitable capacitor, see Frequency Compensation of A-C Instruments, by John H. Miller, Transactions of the American Institute of Electrical Engineers, volume 70, 1951, pages 217–221. However, the total inductance of the instrument does not remain constant but varies with actual pointer deflection which causes the meter to have an error as the deflection changes from the point at which compensation was obtained in the first instance. This is referred to as scale error.

An object of this invention is the provision of a simple means for counteracting the scale error of an electrodynamometer instrument whereby the initial calibration accuracy of the instrument will obtain throughout the deflection range of the pointer.

An object of this invention is the provision of a frequency compensated dynamometer instrument wherein the inherent scale error is reduced materially whereby the instrument will provide indications of high accuracy at frequencies higher than is now possible with instruments of this class.

These and other objects and advantages will be apparent from the following description when taken with the accompanying drawing in which the single view is a diagrammatic showing of an electrodynamometer instrument made in accordance with this invention.

The electrodynamometer instrument has a pair of field windings 1 and 2 and a pivotally mounted movable coil 3. One of the instrument terminals 4 is connected to one end of the field coil 1 by the lead 6 and the other end of the field coil 1 is connected to one end of the field coil 2 by the lead 7. The other end of the field coil 2 is connected to the movable coil 3 by the lead 8 and the lead 9 connects the other end of the movable coil to the series resistors 10, 11, the latter being connected to the other instrument terminal 5 by the lead 12. It is apparent, therefore, that the field coils, the movable coil and the resistors 10, 11 are all connected in series. The movable coil carries a pointer 13 cooperating with a suitably calibrated scale 14.

When an alternating current potential is applied across the instrument terminals 4 and 5 the series connected field coils establish an alternating magnetic flux field that cuts across the movable coil. The flux field generated by the movable coil reacts with that generated by the field coils resulting in rotation of the movable coil whereupon the magnitude of the energizing potential is indicated by the position of the pointer with respect to the calibrated scale. Those skilled in this art will understand that the movable coil and pointer return to the zero scale position when the external circuit is disconnected from the instrument terminals, conventional hair springs being provided for this purpose.

The electrodynamometer voltmeter is a precision mechanism having a high degree of operating accuracy and reliability and it is general practice to calibrate the instrument by applying known values of direct current potential across the terminals 4, 5. However, when energized by alternating current potentials the instrument will indicate low due to the inductance of the field and movable coils which causes the impedance of the instrument circuit to increase above the direct current value. This error can be kept small either by limiting the frequency of the applied voltage to some relatively low value such as 125 cycles per second or by compensating for the impedance change by connecting a capacitor 15 across part of the series resistance, such as the resistance 11 shown in the drawing. Such a capacitor compensates for the change in the instrument inductance over a fairly wide frequency range at any given scale position of the pointer. However, the total inductance of the instrument does not remain constant but varies with pointer deflection.

In the case of a standard, precision 75 volt range instrument, frequency compensation of the type provided by the capacitor 15 is done at the 60 volt scale mark. By assigning a proper value to the capacitor 15 such instrument will have an indication error of only .03% of full scale deflection at 1,000 cycles per second at the point of initial compensation, namely, the 60 volt scale mark. At the 75 volt scale mark, however, the change in the mutual inductance between the field and movable coils is enough to cause the pointer indication to be low by 0.33% of full scale deflection at 1,000 cycles per second. At the lower portions of the scale the error results in a high pointer indication 0.20% of full scale deflection. This type of error, which varies with the relative position of the movable and field coils, is known as the scale error and compels a compromise between instrument accuracy and frequency range.

I have found that the frequency range of a dynamometer instrument can be doubled, while maintaining a high initial accuracy, by inserting a capacitor directly across the movable coil 3, as shown by the capacitor 16 in the drawing. Such capacitor compensates for the scale error by introducing into the movable coil a current which causes the movable coil to tend to deflect to a higher than normal position at the high end of the scale and a lower than normal position at the lower end of the scale. This current flows as a result of the voltage induced in the movable coil from the alternating magnetic flux generated by the field coils. It will be apparent that the voltage induced in the movable coil varies with the position of the movable coil relative to the field coils. When the planes of these coils are at right angles to each other (zero mutual inductance), no voltage is induced in the movable coil. As the movable coil deflects to one side or the other from the position of zero mutual inductance a voltage is induced therein in one or the other directions. When the capacitor is connected across the movable coil the induced voltage results in a circulating current flow through the movable coil and capacitor. This current will produce an upscale deflection torque of the movable coil when the pointer is to the right of the center scale mark and a down scale deflection torque when the pointer is to the left of the center scale mark. Thus, by assigning a proper value to the capacitor 16, the circulating current can be made to counteract the effect of the change in inductance brought about by rotation of the movable coil. The scale error varies with the deflection of the movable coil. The circulating current also varies with the deflection of the movable coil since the magnitude of the induced voltage varies with the position of the movable coil relative to the fixed field coils. Since the scale error and the circulating current vary in opposite sense almost exact frequency compensation may be obtained. In the case of the standard, representative instrument, mentioned above, the addition of a suitable capacitor across the movable coil reduced the maximum scale error to 0.02% of full scale deflection at 1,000 cycles per second. From a practical standpoint this means that the frequency range of the instrument can be doubled for the same wattage consumption.

Having now described my invention what I desire to protect by Letters Patent of the United States is set forth in the following claim.

I claim:

A frequency compensated dynamometer voltmeter comprising a field coil and a movable coil connected in series, said movable coil being pivotally mounted for rotation to either side of the position of zero mutual inductance with respect to the field coil upon connection of the field and movable coils to a source of alternating current; a pointer carried by the field coil and cooperating with a scale calibrated in volts; and a capacitor connected directly across the movable coil, said capacitor having a value such that the circulating current flowing in the movable coil and capacitor as a result of the voltage induced in the movable coil will produce a coil rotation torque that is opposite to that brought about by a corresponding change in the mutual inductance between the field coil and movable coil as the latter is displaced from the position of zero mutual inductance.

References Cited in the file of this patent
UNITED STATES PATENTS 1,677,694    Vogdes _____ July 17, 1928